F. L. BEAMOND.
TRANSPORTING APPARATUS.
APPLICATION FILED AUG. 19, 1907.

908,441.

Patented Jan. 5, 1909

3 SHEETS—SHEET 1.

WITNESSES:

INVENTOR,
FRANK LOESCHER BEAMOND,
BY van Idennel & Schoenlank
Attorneys.

F. L. BEAMOND.
TRANSPORTING APPARATUS.
APPLICATION FILED AUG. 19, 1907.

908,441.

Patented Jan. 5, 1909.

3 SHEETS—SHEET 2.

INVENTOR,
FRANK LOESCHER BEAMOND,

F. L. BEAMOND.
TRANSPORTING APPARATUS.
APPLICATION FILED AUG. 19, 1907.

908,441.

Patented Jan. 5, 1909.

3 SHEETS—SHEET 3.

WITNESSES:

INVENTOR,
FRANK LOESCHER BEAMOND,
BY van Oldenneel & Schoenlank
Attorneys.

UNITED STATES PATENT OFFICE.

FRANK LOESCHER BEAMOND, OF SUTTON COLDFIELD, ENGLAND.

TRANSPORTING APPARATUS.

No. 908,441.

Specification of Letters Patent.

Patented Jan. 5, 1909.

Application filed August 19, 1907. Serial No. 389,084.

*To all whom it may concern:*

Be it known that I, FRANK LOESCHER BEAMOND, residing at Field House, Mere Green Road, Sutton Coldfield, in the county of Warwick, England, farmer, have invented certain new and useful Improvements in Transporting Apparatus, of which the following is a specification.

This invention relates to improvements in endless tracks supporting and driving arrangements for motor and other road vehicles, and consists particularly in the arrangement of the same for driving, without the necessity of using road wheels, and in the improved construction of the parts with the object of reducing the force of traction necessary to overcome the resistance to movement.

In the case of a motor vehicle, I transmit the drive from the engine to sprocket wheels arranged on each side of the vehicle and over these sprocket wheels the endless track is arranged. The track may be built up to engage the teeth of the sprockets, or it may be carried on a chain for this purpose.

In the case of horse drawn or other trailing vehicles, where there is no drive to transmit, I arrange the track to work over guides on each side of the vehicle.

In supporting the track, I employ two channel members, one on each side of the vehicle; these channels are rigidly connected with the vehicle underframe or chassis. The channels are inverted and arranged close to the ground and bear on the track through roller bearing chains arranged to work round with same. The bearing chains are provided with horizontal and vertical rollers and are so disposed between the track and the vehicle supporting channels as to take the downward and lateral thrust when the vehicle is in motion.

In order that the invention may be readily understood and easily carried into practice, I have appended hereunto three sheets of drawings illustrating the methods of carrying out the same.

Figure 1:
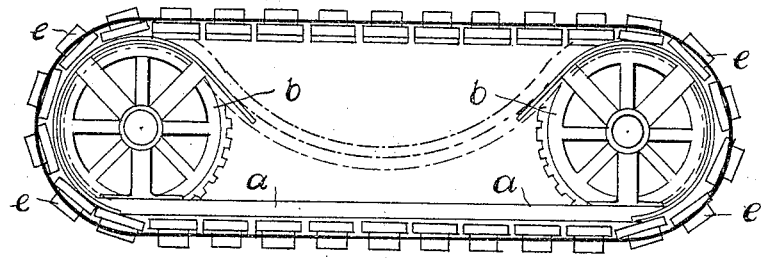
Figure 2:
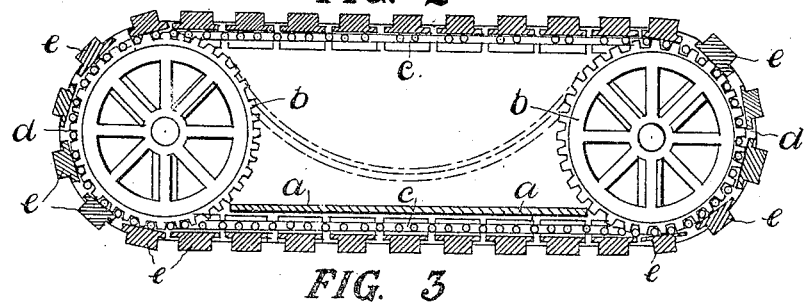
Figure 3:
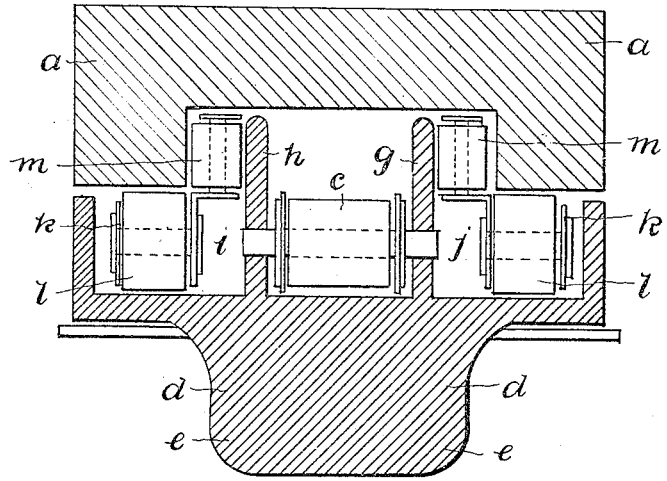
Figure 4:
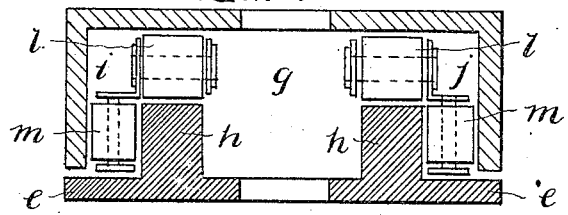
Figure 5:
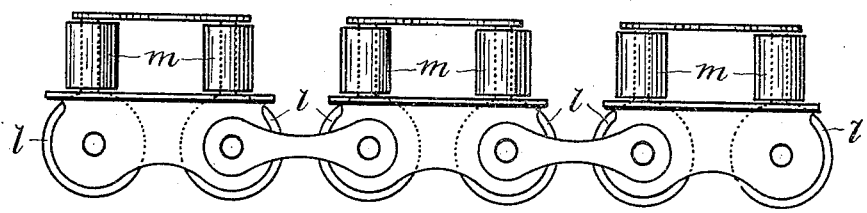
Figure 6:
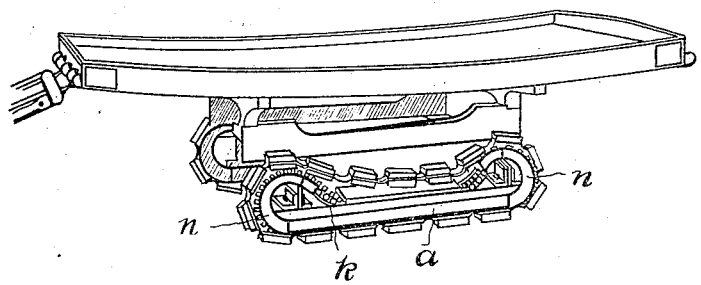
Figure 7:
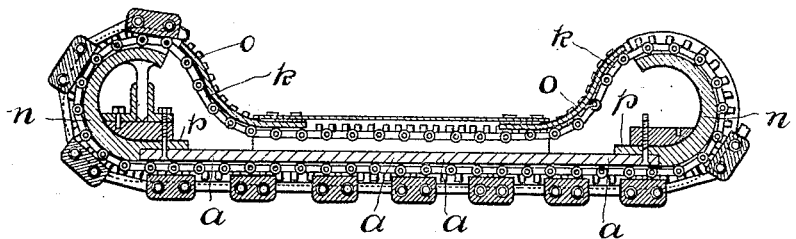
Figure 8:
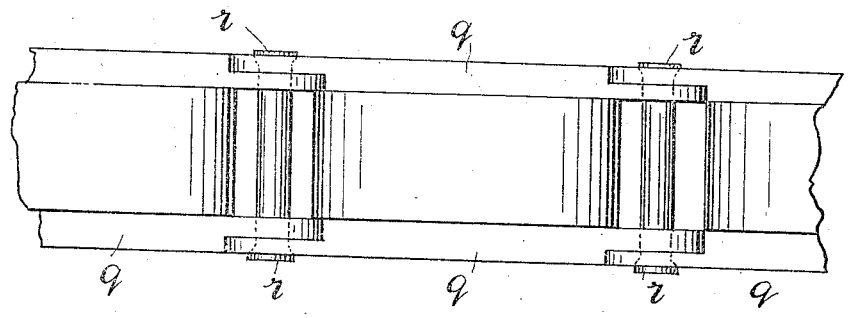
Figure 9:
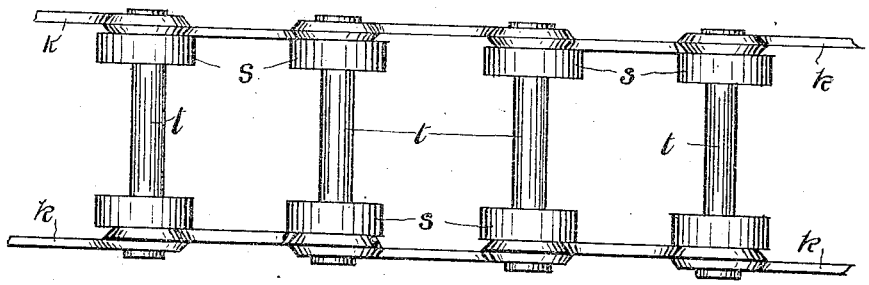
Figure 10:
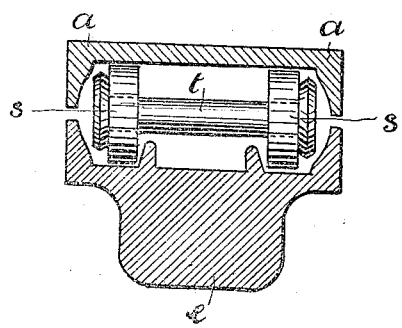

Figure 1. is an elevation of the endless track arranged for a mechanically propelled vehicle. Fig. 2. is a longitudinal section of the same. Fig. 3. is an enlarged transverse section through the supporting channel and the track. Fig. 4. is a similar view to Fig. 3, but showing a modified form of track. Fig. 5. is an elevation of a portion of a bearing chain. Fig. 6. is a perspective view showing a trailing vehicle constructed in accordance with my invention. Fig. 7. is a sectional view of a track arrangement suitable for such a vehicle. Fig. 8. is a plan of a simple construction of track, and Fig. 9. shows a simple way in which the bearing chains can be arranged. Fig. 10. shows the simple form of chain in use between the track and the channels.

In carrying out my invention for application to motor vehicles as shown at Figs. 1, 2, and 3, I employ on each side of the vehicle a stout inverted channel $a$ directly connected to the vehicle chassis. On each channel member $a$ sprocket wheels $b$ are mounted and over these an endless driving chain $c$ is arranged. At least one pair of sprockets $b$ is driven from the engine thereby rotating the chain $c$. Each chain $c$ in its rotation passes under a trough or channel member $a$ as seen at Fig. 2. To the driving chain $c$ the endless track $d$ is connected. The track consists of a series of blocks $e$ which may be provided with a band of balata or the like or may be separate from each other. The blocks may have rubber or the like projecting from their outer surface to prevent wearing and damage of the road and to render the track silent in use. Each block is shaped on its inner side with a central recess $g$ between two ribs $h$ and two side recesses $i$ $j$ more clearly seen at Fig. 3. The central recess $g$ is for mounting the block on the driving chain, the block being secured by pins passing through the ribs $h$. The blocks forming the tracks pass with the chains $c$ under the channels $a$ so that the weight of the vehicle which comes on the channels is brought onto the portion of the track beneath same. To satisfactorily provide a bearing for this and enable the tracks working smoothly under the channels, bearing chains $k$ are employed.

These chains $k$ are constructed with horizontal rollers $l$ carried between side plates on pins in the usual way and also with vertical rollers $m$ mounted on pins in right angle extensions of the side plates as seen at Fig. 4. Two of these bearing chains are preferably employed to each track; they are arranged to work round in the recesses $i$ and $j$ of the blocks. In use the horizontal rollers $l$ take the bearing of the vehicle on the tracks through the channels $a$ while the vertical rollers $m$ bear against the ribs $h$ of the blocks and take any lateral thrust of the vehicle on the tracks. The construction of the blocks of the track and channels for accommodating these bearing chains may obviously be open to modification. A different form is shown at Fig. 4, where the horizontal rollers $l$ bear on the tops of stout ribs while the vertical rollers bear on the sides of same.

In the case of the trailing vehicle shown at Fig. 6, the endless track passes over guides $n$, secured to the ends of the channels $a$ instead of over sprocket wheels. The bearing chains $k$ are used as before between the tracks and the channels. On the drawings these chains are arranged, after clearing the channels $a$ and the guides $n$ to pass down nearly onto the top of the channels by guiding plates $o$ and for a short distance over the channels are covered in as seen at Fig. 7. The chains may however be passed back practically along the top of the channel avoiding its following the track round on its travel and during the return may be passed through oil baths or the like to insure effective lubrication. The connections to the underframing of the vehicle can be made from the extensions $p$ from the guides $n$ when the bolts securing the cross connecting members may also secure the guides to the channels.

The endless track may be formed in a variety of ways, such as the example shown at Fig. 8, where the blocks have side plates $q$ shouldered down and hinged on pins $r$ after the manner of a chain. This track is simple of construction and is particularly suitable for trailing vehicles. Other modifications may be employed however, such as blocks mounted on a balata or like bands.

In the case of the bearing chains $k$, a simple construction may be employed where guides $n$ are used instead of driving sprockets $b$. An example of this chain is shown at Figs. 9 and 10, where the rollers $s$ are made integral with a shaft $t$ and are mounted on pins passing through ordinary chain side plates. In use the rollers of this chain would run on the side plates of the track which may be grooved to accommodate them.

What I claim then is:

1. In vehicles, endless tracks, horizontal inverted channel members, connected to the vehicle and arranged to bear on the endless tracks as they pass round, in combination with bearing chains having two sets of rollers on axes at right angles to each other, arranged to work round between the tracks and the channels to take the vertical and lateral thrust on the same, substantially as described.

2. In propelled vehicles, endless tracks, horizontal inverted channel members, connected to the vehicle and arranged to bear on the tracks as they pass round, and sprocket wheels supported from said channels for moving the endless tracks, in combination with bearing chains having two sets of rollers on axes at right angles to each other, arranged to work round between the tracks and the channels to take the vertical and lateral thrust on the same.

3. In endless track vehicles, tracks working under inverted channels secured to the vehicle and over guides at the ends of same, with bearing chains each comprising two roller systems on axes at right angles to each other between the channels and the tracks, substantially as described.

In testimony whereof, I, the said FRANK LOESCHER BEAMOND have signed my name to this specification in the presence of two subscribing witnesses, this 26th day of July 1907.

FRANK LOESCHER BEAMOND.

Witnesses:
T. GILBERT BRETTELL,
STANLEY BANNER.